United States Patent
Chen et al.

(10) Patent No.: US 11,776,281 B2
(45) Date of Patent: Oct. 3, 2023

(54) SYSTEMS AND METHODS FOR TRAFFIC LIGHT DETECTION AND CLASSIFICATION

(71) Applicant: Toyota Research Institute, Inc., Los Altos, CA (US)

(72) Inventors: Kun-Hsin Chen, Mountain View, CA (US); Kuan-Hui Lee, San Jose, CA (US); Jia-En Pan, Mountain View, CA (US); Sudeep Pillai, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 148 days.

(21) Appl. No.: 17/130,435

(22) Filed: Dec. 22, 2020

(65) Prior Publication Data

US 2022/0198204 A1    Jun. 23, 2022

(51) Int. Cl.
*G06V 20/00* (2022.01)
*G06V 20/58* (2022.01)
(Continued)

(52) U.S. Cl.
CPC ............ *G06V 20/584* (2022.01); *G06F 18/21* (2023.01); *G06F 18/24* (2023.01); *G06N 3/044* (2023.01);
(Continued)

(58) Field of Classification Search
CPC .. G06V 20/584; G06V 30/274; G06K 9/6217; G06K 9/6267; G06N 3/0445; G06N 3/0454; G06T 7/248; G06T 2207/10016; G06T 2207/20084; G06T 2207/30252; G08G 1/095; G08G 1/09623
See application file for complete search history.

(56) References Cited

U.S. PATENT DOCUMENTS 9,002,055 B2   4/2015   Funayama et al.
10,061,322 B1   8/2018   Palefsky-Smith
(Continued)

FOREIGN PATENT DOCUMENTS

CN   106845453 A   6/2017
JP   6908445 B2   7/2021
WO   2020048265 A1   12/2020

OTHER PUBLICATIONS

Duan et al, CenterNet: Keypoint Triplets for Object Detection, Proceedings of the IEEE/CVF International Conference on Computer Vision (ICCV), pp. 6569-6578 (Year: 2019).*

(Continued)

*Primary Examiner* — Nancy Bitar
*Assistant Examiner* — Xiao Liu
(74) *Attorney, Agent, or Firm* — Christopher G. Darrow; Darrow Mustafa PC

(57) ABSTRACT

A traffic light classification system for a vehicle includes an image capture device to capture an image of a scene that includes a traffic light with multiple light signals, a processor, and a memory communicably coupled to the processor and storing a first neural network module including instructions that when executed by the processor cause the processor to determine, based on inputting the image into a neural network, a semantic keypoint for each light signal in the traffic light, and determine, based on each semantic keypoint, a classification state of each light signal.

20 Claims, 6 Drawing Sheets

(51) Int. Cl.
| | |
|---|---|
| G06T 7/246 | (2017.01) |
| G06V 30/262 | (2022.01) |
| G06F 18/21 | (2023.01) |
| G06F 18/24 | (2023.01) |
| G06N 3/044 | (2023.01) |
| G06N 3/045 | (2023.01) |
| G08G 1/095 | (2006.01) |

(52) U.S. Cl.
CPC .............. *G06N 3/045* (2023.01); *G06T 7/248* (2017.01); *G06V 30/274* (2022.01); *G06T 2207/10016* (2013.01); *G06T 2207/20084* (2013.01); *G06T 2207/30252* (2013.01); *G08G 1/095* (2013.01)

(56) References Cited

U.S. PATENT DOCUMENTS

| | | | |
|---|---|---|---|
| 10,248,874 | B2 | 4/2019 | Moosaei et al. |
| 10,471,955 | B2 | 11/2019 | Kouri et al. |
| 10,691,692 | B2 | 6/2020 | Hu |
| 11,328,519 | B2 * | 5/2022 | Hsiao .................... G06N 3/049 |
| 2018/0192035 | A1 | 7/2018 | Dabeer et al. |
| 2019/0087672 | A1 | 3/2019 | Wang et al. |
| 2019/0092318 | A1 | 3/2019 | Mei et al. |
| 2019/0329769 | A1 | 10/2019 | Shalev-Shwartz et al. |
| 2020/0098135 | A1 | 3/2020 | Ganjineh et al. |
| 2020/0353932 | A1 * | 11/2020 | Wang ........................ G08G 1/04 |
| 2021/0209797 | A1 | 7/2021 | Lee et al. |

OTHER PUBLICATIONS

Eteifa et al, Predicting Coordinated Actuated Traffic Signal Change Times using LSTM Neural Networks, arXiv:2008.08035 (Year: 2020).*

Wei et al, Traffic Sign Detection and Recognition Using Novel Center-Point Estimation and Local Features, IEEE Access, vol. 8, pp. 83611-83621 (Year: 2020).*

Yoneda et al., "Robust Traffic Light and Arrow Detection Using Digital Map with Spatial Prior Information for Automated Driving," Sensors 2020, 20, 1181, pp. 1-24.

Chen et al., "Accurate and Reliable Detection of Traffic Lights Using Multiclass Learning and Multiobject Tracking," IEEE Intelligent Transportation Systems Magazine, 15 pages (2016).

John et al., "Traffic Light Recognition in Varying Illumination using Deep Learning and Saliency Map," 17th International IEEE Conference on Intelligent Transportation Systems (ITSC), Qingdao, 2014, pp. 2286-2291.

Fairfield et al., "Traffic Light Mapping and Detection," Proceedings—IEEE International Conference on Robotics and Automation, 6 pages (2011).

Lu et al., "Traffic Signal Detection and Classification in Street Views Using an Attention Model," vol. 4, No. 3, Sep. 2018, 253-266.

Lopez et al., "Vehicle pose estimation via regression of semantic points of interest," 2019 11th International Symposium on Image and Signal Processing and Analysis (ISPA), 6 pages.

Murthy et al., "Shape Priors for Real-Time Monocular Object Localization in Dynamic Environments," 2017 IEEE/RSJ International Conference on Intelligent Robots and Systems (IROS), 7 pages.

Li et al., "Recognizing Car Fluents from Video," arXiv:1603.08067v1 [cs.CV] Mar. 26, 2016, 15 pages.

Ding et al., "Vehicle Pose and Shape Estimation through Multiple Monocular Vision," rXiv:1802.03515v5 [cs.CV] Nov. 11, 2018, 7 pages.

Lee et al., "An Attention-based Recurrent Convolutional Network for Vehicle Taillight Recognition," arXiv:1906.03683v1 [cs.CV] Jun. 9, 2019, 6 pages.

Non-Final Office Action for U.S. Appl. No. 17/192,443, dated Dec. 15, 2022, 15 pages.

Final Office Action for U.S. Appl. No. 17/192,443, dated Mar. 22, 2023, 15 pages.

* cited by examiner

SYSTEMS AND METHODS FOR TRAFFIC LIGHT DETECTION AND CLASSIFICATION

TECHNICAL FIELD

The subject matter described herein relates, generally, to systems and methods for detecting and classifying traffic lights, and more particularly, to systems and methods that use semantic keypoint representations to determine classifications for each bulb in a traffic light.

BACKGROUND

Traffic light detection and classification in urban environments is one of the more challenging tasks in autonomous vehicle operations due in part to the wide variety of scenarios that can be presented to a vehicle. A vehicle, such as an autonomous or semi-autonomous vehicle, must be able make a determination that it is approaching a traffic light far enough in advance to take analytical action, and must be able to correctly identify a status of the traffic light with enough distance remaining to stop or slow down if necessary. Conventional traffic light detection systems generally utilize some type of image-based, 2-dimensional (2D) detection. In this method, the system captures an image and attempts to predict a bounding box enclosing a traffic light housing. Based on analysis of the bounding box, the convention system attempts to classify a single state of the traffic light, e.g., red light, yellow light or green light. This approach may require an increasing amount of computational difficulty and degraded performance in complex scenarios, for example, at intersections that include multiple traffic light boxes with varying configurations for multiple lanes.

SUMMARY

The disclosed systems and methods relate to a vehicle traffic light classification system that can determine one semantic keypoint per bulb of a traffic light and use this representation to determine a classification (e.g., on/off) for each bulb, and in turn, for the traffic light. The disclosed embodiments can improve speed of classification, improve the accuracy of classification with a richer ontology (able to detect/classify flashing lights) and significantly reduce costs associated with annotating large-scale traffic light datasets for machine learning training.

In one embodiment, a traffic light classification system for a vehicle, includes an image capture device that captures an image of a scene which includes a traffic light with multiple light signals and a processor. The traffic light classification system further includes a memory communicably coupled to the processor and storing a first neural network module including instructions that when executed by the processor cause the processor to determine, based on inputting the image into a neural network, a semantic keypoint for each light signal in the traffic light, and determine, based on each semantic keypoint, a classification state of each light signal.

In one embodiment, a method of classifying a traffic light includes capturing an image of a scene that has a traffic light with multiple light signals, determining, with a neural network, a semantic keypoint for each light signal of the traffic light based on the image, and determining a classification state of each light signal based on the semantic keypoints.

In one embodiment, a non-transitory computer-readable medium for classifying a traffic light, includes instructions that, when executed by one or more processors, cause the one or more processors to capture an image of a scene that has a traffic light with multiple light signals, determine, with a neural network, a semantic keypoint for each light signal of the traffic light based on the image, and determine a classification state of each light signal based on the semantic keypoints.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improved traffic light detection and classification are disclosed. In contrast to conventional 2D detection techniques that use a bounding box to detect a traffic light housing, the disclosed embodiments detect each individual traffic light bulb based on semantic keypoint analysis and classify the states of each individual bulb. The disclosed embodiments can determine a correct traffic signal that a traffic light is displaying based on the individual bulb detection and classification.

As another contrasting point, conventional techniques require a model that must learn to identify the four corners of the traffic light housing (i.e., the traffic light frame) to create the bounding box. This requires a large, training dataset with each of the corners of the traffic light housing annotated, which can be expensive and time-consuming to compile. The disclosed embodiments do not require the same level of detailed annotation that is used in conventional techniques, and thus provides the advantage of reducing implementation costs.

Figure 1:
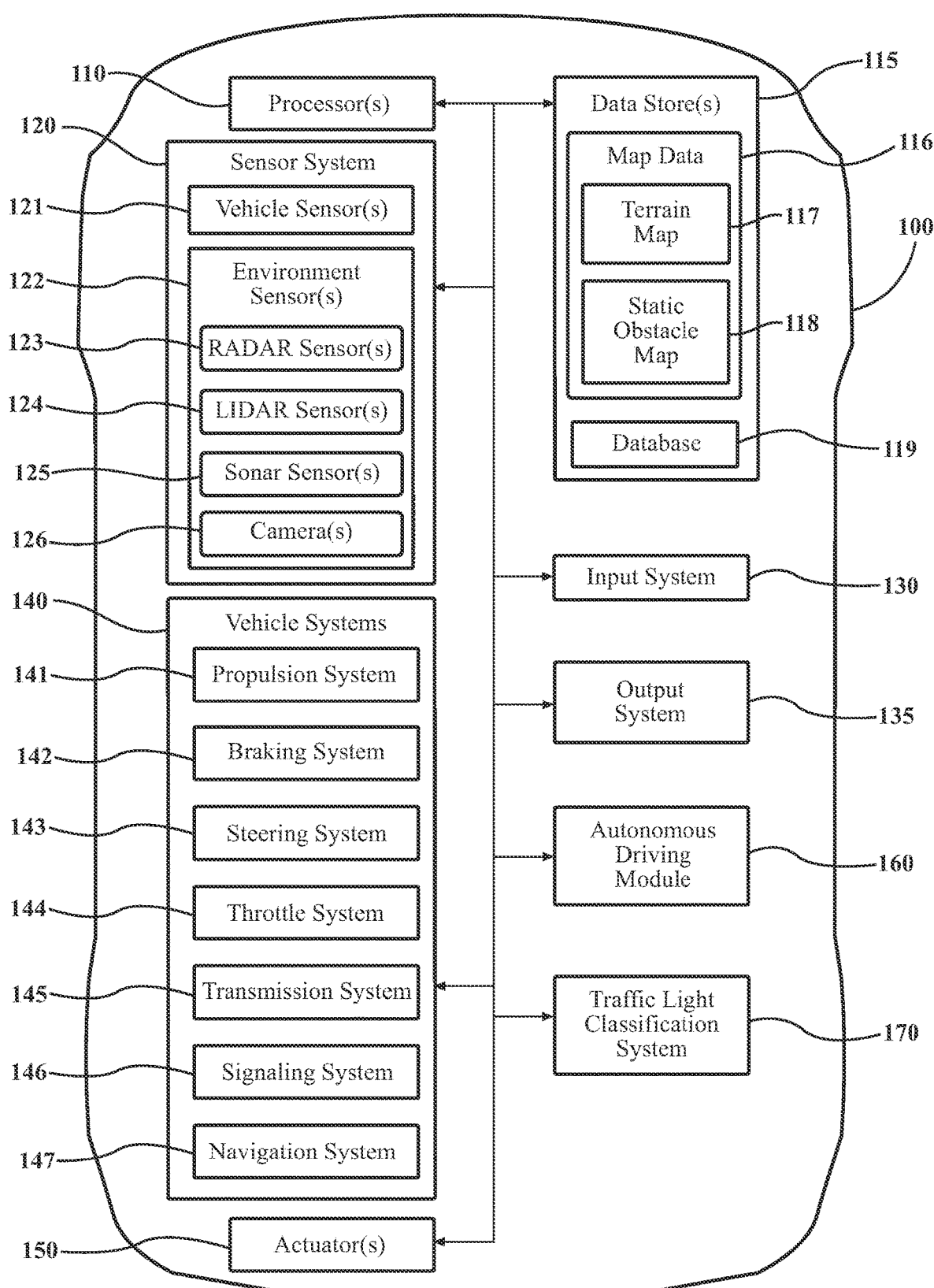
FIG. 1 illustrates one embodiment of a vehicle within which embodiments disclosed herein may be implemented.

Referring to FIG. 1, an example of a vehicle 100 is illustrated. As used herein, a "vehicle" is any form of transport that is used for moving people, animals, goods, or the like. In one or more implementations, the vehicle 100 is an automobile. While arrangements will be described herein generally with respect to automobiles, it should be understood that the scope of the disclosed subject matter is not limited to automobiles. In some implementations, the vehicle 100 may be any form of powered, multi-wheeled transport or vehicle that may be required to identify and classify a traffic light and thus can benefit from the functionality discussed herein.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-7 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes a traffic light classification system 170 that is implemented to perform methods and other functions as disclosed herein relating to detecting and classifying traffic lights that the vehicle 100 may be approaching. The noted functions and methods will become more apparent in the following discussion of the figures.

Figure 2:
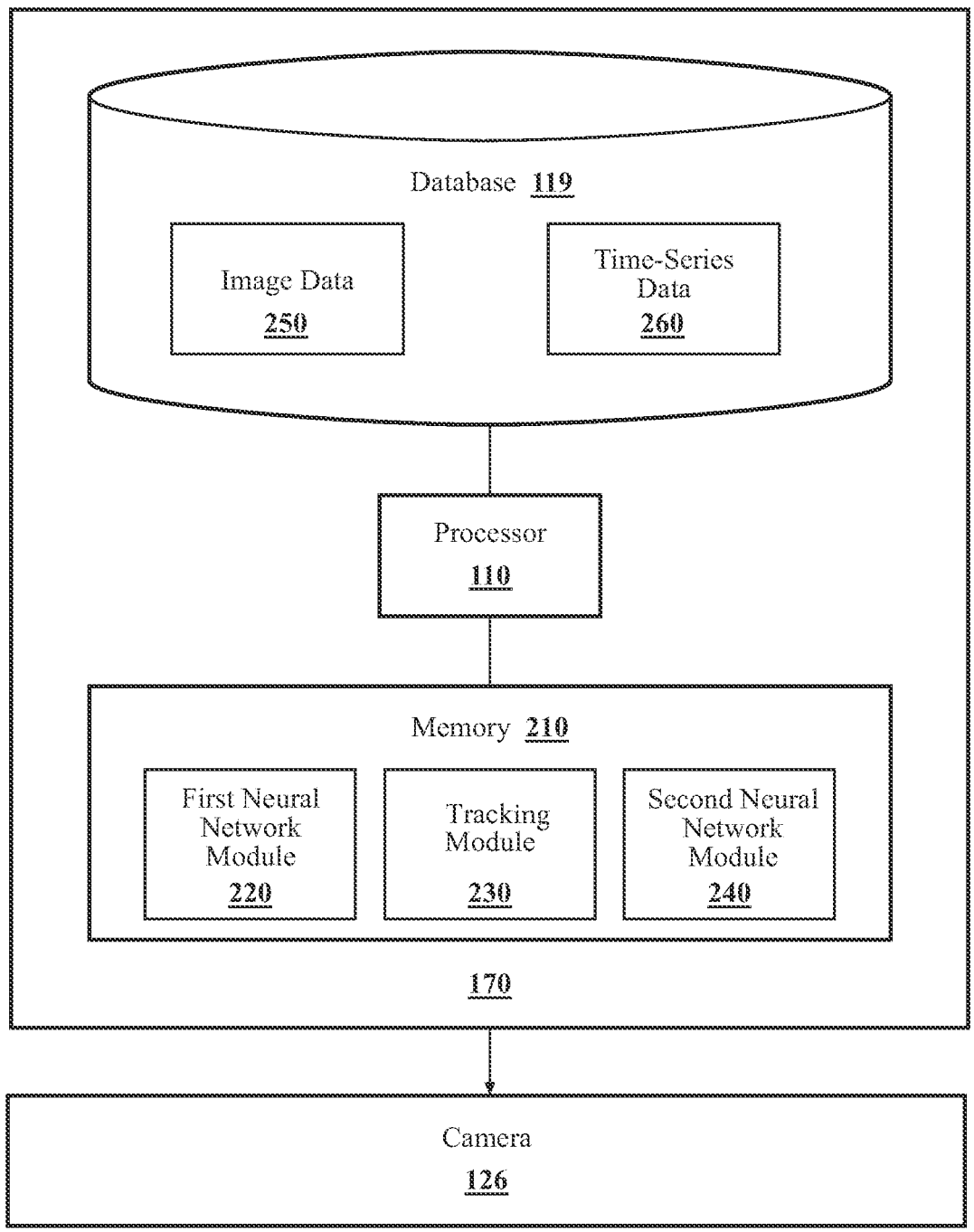
FIG. 2 illustrates one embodiment of a traffic light classification system according to the disclosed subject matter.

With reference to FIG. 2, one embodiment of an implementation of the traffic light classification system 170 of FIG. 1 is illustrated. The traffic light classification system 170 is shown as including a processor 110 and database 119 from the vehicle 100 of FIG. 1. Accordingly, the processor 110 may be a part of the traffic light classification system 170, the traffic light classification system 170 may include a processor separate from the processor 110 of the vehicle 100 or the traffic light classification system 170 may access the processor 110 through a data bus or another communication path.

The system 170 can receive one or more images from a camera 126, for example, a camera that is part of a sensor system 120 of the vehicle 100. The camera 126 can capture a sequence of images of a scene (e.g., around the vehicle 100) that includes a traffic light.

The traffic light classification system 170 includes a database 119 that stores, among other things, image data 250 (e.g., sequence of images captured by the camera 126) and time-series data 260 (e.g., feature vectors determined from the image data 250), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the traffic light classification system 170, in one or more embodiments, includes a memory 210 that stores a first neural network module 220, a tracking module 230, and a second neural network module 240. The memory 210 can be constructed as a random-access memory (RAM), read-only memory (ROM), a hard-disk drive, a flash memory, or other suitable memory for storing the modules 220, 230 and 240.

The modules 220, 230 and 240 are, for example, constructed as computer-readable instructions that when executed by the processor 110 cause the processor 110 to perform the various functions disclosed herein.

As described herein, a traffic light can display any of multiple possible "light signals" (e.g., a red-light signal, a yellow-light signal, a green-light signal, an arrow signal, etc.). Each light signal is activated by the traffic light turning on a light source such as a bulb, a light-emitting diode (LED) or an array of LEDs for a given signal. For example, a traffic light can activate a green bulb or a circular array of green LEDs to activate a green-light signal.

The first neural network module 220 is generally constructed including instructions that function to control the processor 110 to determine, based on an image of a scene captured by the camera 126, a semantic keypoint for each detected possible light signal of a traffic light and, based on the semantic keypoints, output a classification state for each of the detected light signals, from which a classification of the traffic light may be determined.

A "semantic keypoint" as used herein refers to a specific point of interest with a determined semantic meaning for an object in an image. In one or more embodiments, the semantic keypoint corresponds to a single pixel in the image. A machine learning algorithm, such as a neural network, can be trained to predict semantic keypoints based on an image input. In one or more embodiments, the first neural network module 220 implements a convolution neural network (CNN) that can output heatmaps which indicate a confidence level of a classification state for a given semantic keypoint.

In one or more embodiments that implement temporal analysis features, the camera 126 can capture a sequence of images of the scene. The first neural network module 220 can determine a plurality of semantic keypoints for each image in the series of images and generate a plurality of feature vectors that describe each of the plurality of semantic keypoints, respectively.

The tracking module 230 is generally constructed including instructions that function to control the processor 110 to track a target light signal semantic keypoint across the sequence of images based at least in part on a plurality of feature vectors, and create a time-series set of feature vectors associated with the target light signal.

The second neural network module 240 is generally constructed including instructions that function to control the processor 110 to determine a second classification for a target light signal based at least in part on temporal analysis of the time-series set of feature vectors. In one or more embodiments, the second neural network module 240 implements a long short-term memory (LS™) neural network.

Figure 3:
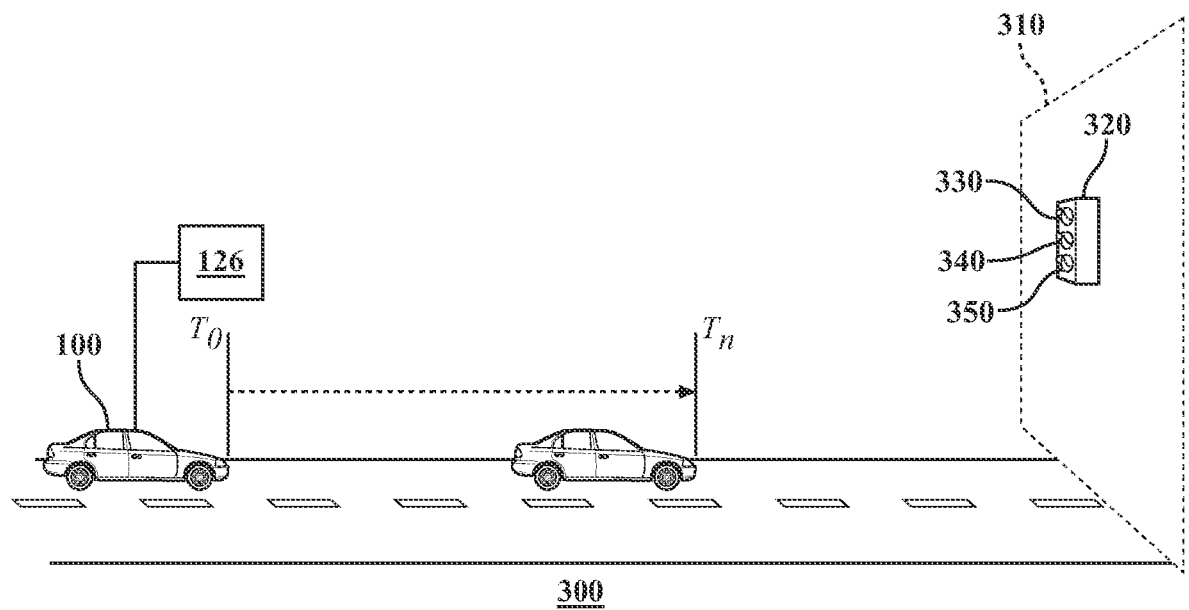
FIG. 3 illustrates an example scenario for use of the disclosed traffic light classification system, according to the disclosed subject matter.

FIG. 3 shows an example scenario 300 of the disclosed traffic light classification system 170. The vehicle 100 is shown approaching a traffic light 320 that has three light signals 330, 340, 350. In this example, 330 is a red-light signal, 340 is a yellow-light signal, and 350 is a green-light signal. To simplify the explanation, one traffic light 320 with three light signals (330, 340, 350) is shown. It should be understood, however, that the disclosed embodiments are applicable to other scenarios including multiple traffic lights in different configurations and with different numbers of light signals.

The camera 126 can capture an image 310 of a scene around the vehicle, with the image 310 including the traffic light 320. In one or more embodiments that implement temporal analysis, the camera 126 can capture a plurality of images over a period of time, e.g., from time $T_0$ to $T_n$, at a predetermined frequency, e.g., 10 hz. The system 170 can store the one or more images as image data 250.

The traffic light classification system 170 (e.g., first neural network module 220) inputs the image 310 into a neural network. In one or more embodiments, the neural network can attempt to classify each pixel in the image and output heatmaps that indicate a confidence of a classification for each semantic keypoint in the image. In one or more embodiments, the traffic light classification system 170 can select a semantic keypoint that that has a highest confidence level for a light signal classification. Thus, each semantic keypoint has a classification and a position in the image corresponding to a specific pixel. In one or more embodiments, a semantic keypoint can correspond to a cluster of pixels within a region of interest (ROI).

Thus, in one or more embodiments, the neural network is implemented as a convolutional neural network (CNN) trained to localize each light signal in an image, determine a semantic keypoint for each light signal, and determine a classification for each semantic keypoint. In one or more embodiments, the classification identifies one or more characteristics of a state of the light signal, e.g., on/off, color, shape, arrow, etc. For example, the neural network can classify a semantic keypoint as a round green light that is on, or a yellow arrow light that is off, etc.

Figure 4:
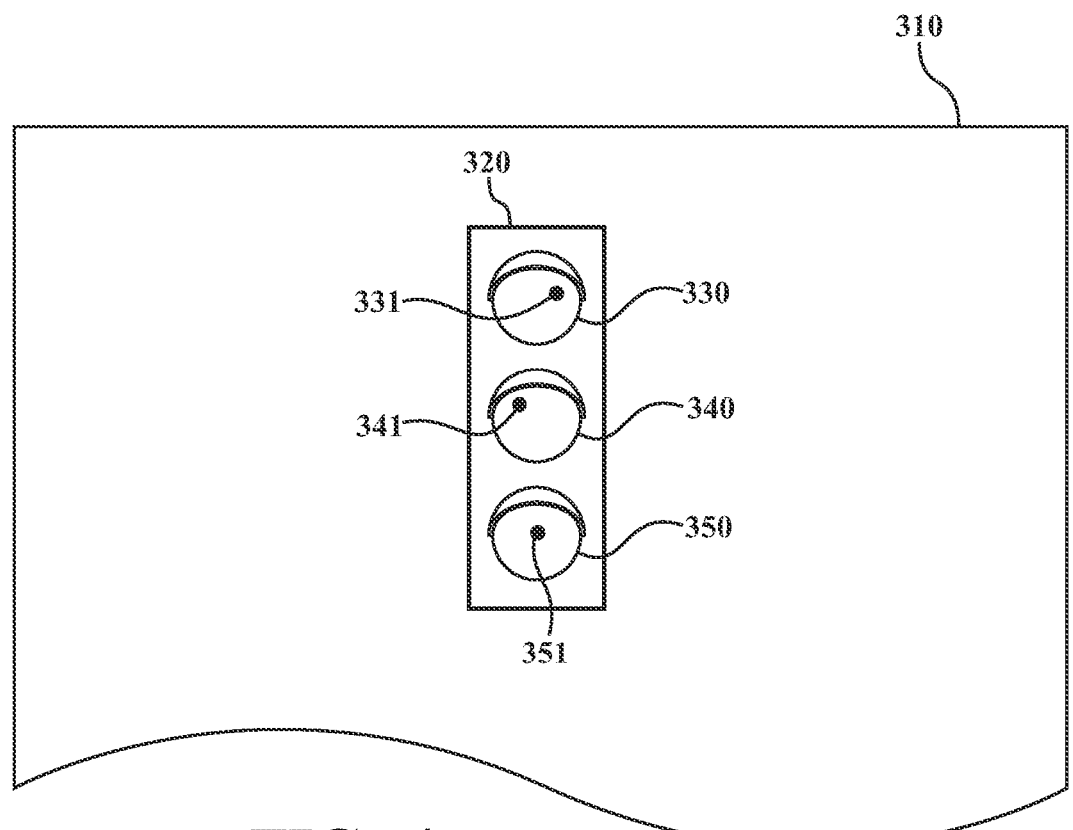
FIG. 4 illustrates a portion of an example image including a traffic light, according to the disclosed subject matter.

FIG. 4 shows a portion of an example image 310 including the traffic light 320. For each light signal (330, 340, 350) in the traffic light 320, the neural network determines and outputs a corresponding semantic keypoint (331, 341, 351). In one or more embodiments, the semantic keypoints 331, 341, 351 each correspond to a pixel in the image 310.

Accordingly, the disclosed embodiments do not need to utilize conventional 2D bounding boxes to detect the edges of a traffic light housing and determine a classification of the traffic light based on a bounding box regression. In fact, the disclosed embodiments can entirely forego detecting the contours of the traffic light housing. Bypassing this aspect of conventional 2D detection allows the disclosed embodiments to achieve higher computational speeds and higher operational efficiency compared to conventional techniques.

In one or more embodiments, the neural network can generate a feature vector associated with each semantic keypoint. In one or more embodiments, the feature vector is a multi-dimensional array that describes the semantic keypoint and/or the pixel(s) that the semantic keypoint corresponds to.

As mentioned above, in one or more embodiments the disclosed traffic light classification system 170 can use time-series data and temporal analysis to determine an improved classification with a richer ontology. For example, a blinking light can be classified with temporal information. To execute the temporal analysis, the camera 126 can capture a series of images over a period of time, e.g., from $T_0$ to $T_n$. For example, the camera 126 can capture images at a frequency of at least 5 Hz. In one or more embodiments, the camera 126 can capture images at a frequency of 10 Hz.

Figure 5:
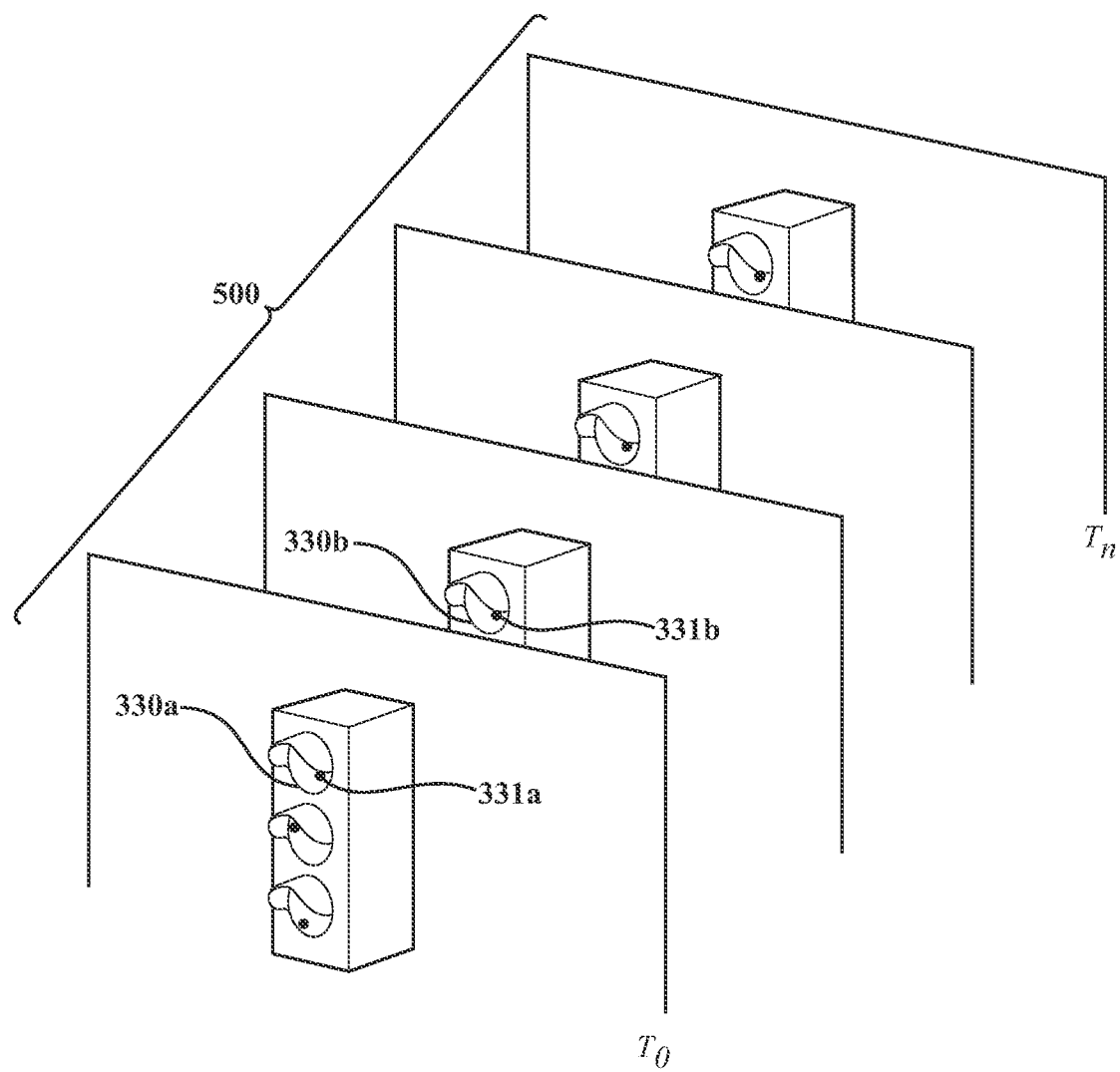
FIG. 5 illustrates an example sequence of images, according to the disclosed subject matter.

FIG. 5 shows an example sequence of images 500. The traffic light classification system 170 (e.g., first neural network module 220) can determine a semantic keypoint 331*a* (and its associated classification and feature vector) for a light signal 330*a* in each image in the sequence of images 500, and likewise for other light signals in the sequence of images 500. The first neural network module 220 can store the classifications and feature vectors as time-series data 260.

The traffic light classification system 170 (e.g., tracking module 230) can track a target light signal across a sequence of images based at least in part on the feature vectors. For example, the tracking module 230 can compare a first set of feature vectors associated with semantic keypoint 331*a* against a second set of feature vectors associated with semantic keypoint 331*b*. The tracking module 230 can determine that the two keypoints represent the same keypoint in different images when the comparison shows that the two sets of feature vectors exceed a similarity threshold. Accordingly, the tracking module 230 can compile a time-series set of feature vectors associated with a target light signal, stored as part of the time-series data 260.

The traffic light classification system 170 (e.g., second neural network module 240) can input the time-series set of feature vectors from the time-series data 260 associated with a semantic keypoint into a second neural network. In one or more embodiments, the second neural network module 240 can implement a long short-term memory (LSTM) neural network. The second neural network module 240 can determine a second classification for the semantic keypoint based on feature vectors from the time-series data 260.

The second classification can include temporal classifications (e.g., a blinking light signal, such as a blinking yellow light) that could not be determined from a single image. Furthermore, the second classification can be more robust to inaccuracy from noise, obstruction or frame error, compared to the first classification from a single frame. For example, a traffic light implemented using LEDs can operate at frequency, e.g., 20 Hz. A single frame capture of the LED traffic light can possibly show the traffic signal as 'off' although it is actually 'on.' By using time-series data in temporal analysis, the traffic light classification system 170 can correctly identify anomalies or aberrations, such as a single off-frame or temporary obstruction, and correctly determine a classification for light signal.

Furthermore, in one or more embodiments the disclosed traffic light classification system 170 (e.g., second neural network module 240) can utilize known transition patterns to further improve the second classification. For example, a traffic light in the United States can have a known transition pattern, i.e., green light, to yellow light, to red light, to green light, etc. The second neural network module 240 can identify a predicted classification as erroneous when the predicted classification breaks the known transition pattern. For example, a classification of semantic keypoint as being a yellow light sequentially and directly after a classification of the semantic keypoint being a red light violates the known transition pattern. In this case, the second neural network module 240 can flag the violating classification as erroneous and disregard it.

In any case, the traffic light classification system 170 can provide an output classification for one or more light signals based on a single image or based on a series of images. The traffic light classification system 170 can accordingly determine a classification of the traffic light display and output the classification to another system of the vehicle 100, such as an autonomous driving module 160, driver assist system, or other system.

Figure 6:
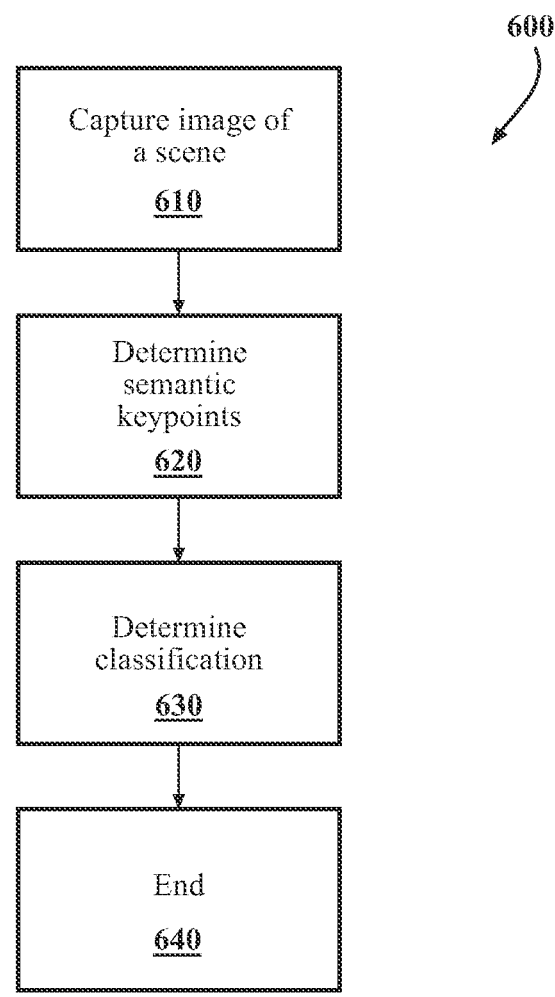
FIG. 6 illustrates a flowchart of a method of classifying a traffic light, according to the disclosed subject matter.

Additional and optional features of the traffic light classification system 170 will now be discussed. FIG. 6 illustrates a flowchart of a method 600 of classifying a traffic light according to the disclosed embodiments. Method 600 will be discussed from the perspective of the traffic light classification system 170 of FIGS. 1 and 2. While method 600 is discussed in combination with the traffic light classification system 170, it should be appreciated that the method 600 is also not limited to being implemented within the traffic light classification system 170 but is instead one example of a system that may implement the method 600.

At operation 610, the traffic light classification system 170 (e.g., camera 126) captures an image of a scene in a vicinity of the vehicle 100. The scene can include a traffic light that has multiple light signals.

At operation 620, the traffic light classification system 170 (e.g., first neural network module 220) can determine semantic keypoints for each light signal of the traffic light by inputting the image into a neural network. In one or more embodiments the neural network is a CNN trained to output a confidence heatmap that indicates confidence levels of estimations of semantic keypoints. In one or more embodiments, the first neural network module 220 selects, for each light signal, a semantic keypoint based on the confidence heatmap. For example, the first neural network 220 can select a semantic keypoint that has a confidence level that exceeds a predetermined threshold. In one or more embodiments, the semantic keypoint is a pixel at location within the image.

At operation 630, the traffic light classification system 170 (e.g., first neural network module 220) can determine a semantic keypoint associated with each light signal and determine a classification state for each light signal based on the semantic keypoints. Based on the light signal classifications, the first neural network module 220 can determine a classification state for the traffic light. For example, the first neural network module 220 can determine, based on the semantic keypoints, that a green light signal and a yellow light signal of a traffic light are both in an 'off' state while a red light signal of the traffic light is in an 'on' state, and thus classify the traffic light as a 'red light.' The process ends at 640.

Figure 7:
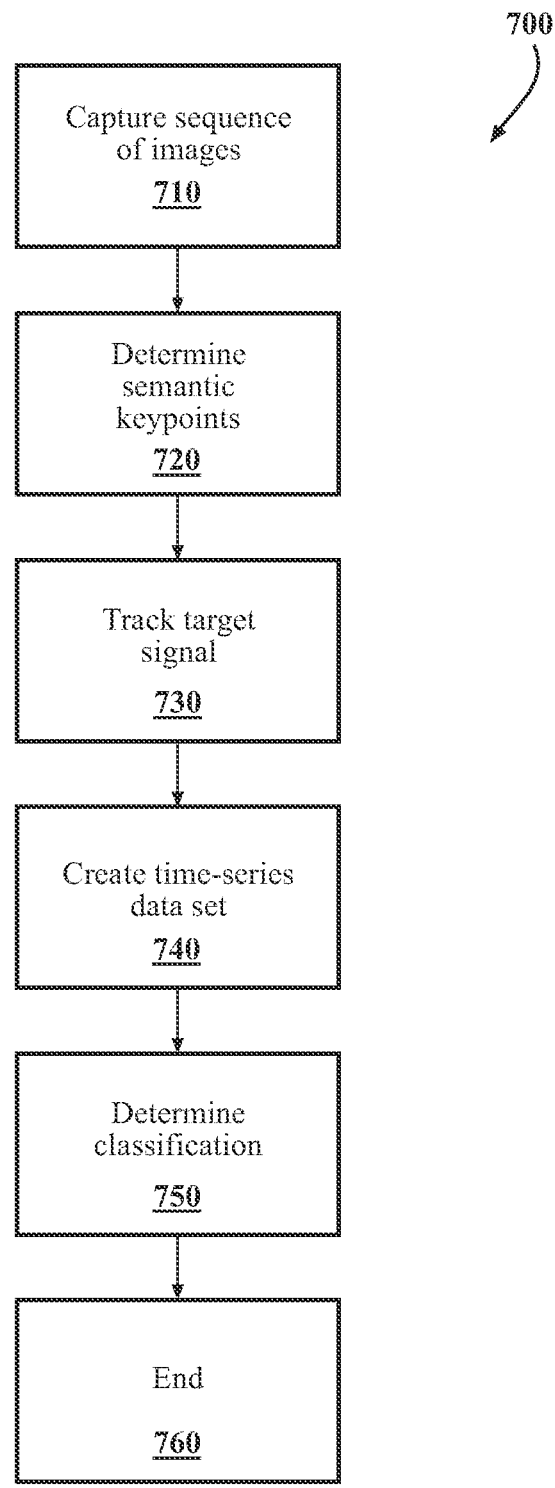
FIG. 7 illustrates a flowchart of a method of classifying a traffic light based on temporal analysis, according to the disclosed subject matter.

FIG. 7 illustrates a flowchart of a method 700 of classifying a traffic light based on temporal analysis according to the disclosed embodiments. Method 700 will be discussed from the perspective of the traffic light classification system 170 of FIGS. 1 and 2. While method 700 is discussed in combination with the traffic light classification system 170, it should be appreciated that the method 700 is also not limited to being implemented within the traffic light classification system 170 but is instead one example of a system that may implement the method 700.

At operation 710, the traffic light classification system 170 (e.g., camera 126) captures a sequence of images of a scene in a vicinity of the vehicle 100. The scene can include a traffic light that has multiple light signals. In one or more embodiments the sequence of images can include timestamp data.

At operation 720, the traffic light classification system 170 (e.g., first neural network module 220) can determine a plurality of semantic keypoints for a plurality of light signals in each image in the sequence of images, e.g., by inputting the images into a neural network. In one or more embodiments the neural network is a CNN trained to output a confidence heatmap that indicates confidence levels of estimations of semantic keypoints and a plurality of feature vectors associated with each semantic keypoint, respectively. The feature vectors each describe aspects of their associated semantic keypoints.

In one or more embodiments, the first neural network module 220 selects, for each of the plurality of light signals, a semantic keypoint based on the confidence heatmap. For example, the first neural network 220 can select a semantic keypoint that has a confidence level that exceeds a predetermined threshold. In one or more embodiments, the semantic keypoint is a pixel at a set location within the image.

At operation 730, the traffic light classification system 170 (e.g., tracking module 230) tracks a target light signal across the sequence of images based at least in part on the plurality of feature vectors. For example, in one or more embodiments the tracking module 230 can compare iterations of semantic keypoints in different images by comparing their associated feature vectors. When the feature vectors similarity exceeds a predetermined threshold, the tracking module 230 determines that the iterations represent the same semantic keypoint in the different images.

At operation 740, the traffic light classification system 170 (e.g., tracking module 230) can create a time-series set of feature vectors associated with the target light signal. The time-series set of feature vectors can include the feature vectors generated in determining the semantic keypoint for the target light signal based on all of the images in the sequence of images. In one or more embodiments, the time-series set of feature vectors can include timestamp data based on associated images.

At operation 750, the traffic light classification system 170 (e.g., second neural network module 240) can determine a second classification for the target light signal based at least in part on the time-series set of feature vectors. In one or more embodiments, the second neural network module 240 can input the time-series set of feature vectors into a second neural network, which outputs a second classification state for the traffic light based on temporal analysis. The second classification state can include states that have a temporal aspect, such as a blinking yellow light, that cannot be identified from a single image or single frame reference. The process ends at 760.

Embodiments disclosed herein can be implemented in any type of vehicle or system that may be required to classify a traffic light. FIG. 1, which shows various components of the vehicle 100, will now be discussed in full detail as an example environment within which the system and methods disclosed herein may operate.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors, for example, that can be powered by the disclosed traffic light classification system 170. "Sensor," as used herein, means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). In one or more embodiments, the input system 130 can be powered by the disclosed traffic light classification system 170.

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, forecast notifications as described above. In one or more embodiments, the output system 135 can be powered by the disclosed traffic light classification system 170.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. In one or more embodiments, the navigation system 147 can be powered by the disclosed traffic light classification system 170.

The processor(s) 110, the traffic light classification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A traffic light detection and classification system for a vehicle, comprising:
    a processor; and
    a memory communicably coupled to the processor and storing:
        a first neural network module including instructions that when executed by the processor cause the processor to: 1) receive, from an image capture device a sequence of images of a scene that includes a traffic light with multiple light signals, and 2) determine, based on inputting the sequence of images into a neural network and for each image in the sequence of images, a semantic keypoint for each light signal in the traffic light based at least in part on a confidence heatmap output from the neural network, determine a classification for the semantic keypoint, and determine, based on each semantic keypoint, a classification state of each light signal, wherein the neural network has been trained to predict semantic keypoints, and the classification for the semantic keypoint identifies a state of a corresponding light signal as being on or off; and
        a second neural network module including instructions that when executed by the processor cause the processor to determine a second classification for a target light signal of the multiple signal lights, the second classification being associated with a temporal characteristic of the target light signal, wherein the temporal characteristic of the target signal light is that the target signal light is configured to blink.

2. The traffic light classification system of claim 1, wherein the neural network is a convolution neural network (CNN) configured to output the confidence heatmap that indicates a confidence level of the classification state for each semantic keypoint.

3. The traffic light classification system of claim 1, wherein the each semantic keypoint corresponds to a single pixel in the image.

4. The traffic light classification system of claim 1, wherein:
    the instructions to determine the semantic keypoint include instructions to determine a plurality of semantic keypoints for a plurality of light signals in the each image in the sequence of images; and
    the first neural network module further includes instructions to generate a plurality of feature vectors that describe each of the plurality of semantic keypoints, respectively.

5. The traffic light classification system of claim 4, further comprising a tracking module including instructions that when executed by the processor cause the processor to track a semantic keypoint associated with the target light signal across the sequence of images based at least in part on the plurality of feature vectors and to create a time-series set of feature vectors associated with the target light signal.

6. The traffic light classification system of claim 5, wherein the instructions to determine the second classification for the target light signal include instructions to determine the second classification for the target light signal based at least in part on the time-series set of feature vectors.

7. The traffic light classification system of claim 6, wherein the second neural network module is configured to implement a long short-term memory (LSTM) neural network.

8. A method of classifying a traffic light, comprising:
    capturing a sequence of images of a scene that has a traffic light with multiple light signals;
    determining, by inputting the sequence of images into a neural network and for each image in the sequence of images, a semantic keypoint for each light signal in the traffic light based at least in part on a confidence heatmap output from the neural network, wherein the neural network has been trained to predict semantic keypoints;
    determining a classification for the semantic keypoint, wherein the classification for the semantic keypoint identifies a state of a corresponding light signal as being on or off;
    determining, based on each semantic keypoint, a classification state of each light signal; and
    determining a second classification for a target light signal of the multiple signal lights, the second classification being associated with a temporal characteristic of the target light signal, wherein the temporal characteristic of the target signal light is that the target signal light is configured to blink.

9. The method of claim 8:
    wherein the neural network is implemented as a convolution neural network (CNN);
    further comprising outputting, from the neural network, the confidence heatmap that indicates a confidence level of the classification state for each semantic keypoint.

10. The method of claim 8, wherein the each semantic keypoint corresponds to a single pixel in the image.

11. The method of claim 8:
    wherein the determining the semantic keypoint comprises determining a plurality of semantic keypoints for a plurality of light signals in the each image in the sequence of images; and
    further comprising generating a plurality of feature vectors that describe each of the plurality of semantic keypoints, respectively.

12. The method of claim 11, further comprising:
tracking a semantic keypoint associated with the target light signal across the sequence of images based at least in part on the plurality of feature vectors; and
creating a time-series set of feature vectors associated with the target light signal.

13. The method of claim 12, wherein the determining the second classification for the target light signal comprises determining, with a second neural network, the second classification for the target light signal based at least in part on the time-series set of feature vectors.

14. The method of claim 13, wherein the second neural network comprises a long short-term memory (LSTM) neural network.

15. A non-transitory computer-readable medium for classifying a traffic light, including instructions that, when executed by one or more processors, cause the one or more processors to:
capture a sequence of images of a scene that has a traffic light with multiple light signals;
determine, by inputting the sequence of images into a neural network and for each image in the sequence of images, a semantic keypoint for each light signal in the traffic light based at least in part on a confidence heatmap output from the neural network, wherein the neural network has been trained to predict semantic keypoints;
determine a classification for the semantic keypoint, wherein the classification for the semantic keypoint identifies a state of a corresponding light signal as being on or off;
determine, based on each semantic keypoint, a classification state of each light signal; and
determine a second classification for a target light signal of the multiple signal lights, the second classification being associated with a temporal characteristic of the target light signal, wherein the temporal characteristic of the target signal light is that the target signal light is configured to blink.

16. The non-transitory computer-readable medium of claim 15:
wherein the neural network is implemented as a convolution neural network (CNN);
further comprising instructions to output, from the neural network, the confidence heatmap that indicates a confidence level of the classification state for each semantic keypoint.

17. The non-transitory computer-readable medium of claim 15, wherein the each semantic keypoint corresponds to a single pixel in the image.

18. The non-transitory computer-readable medium of claim 15:
wherein the instructions to determine the semantic keypoint include instructions to determine a plurality of semantic keypoints for a plurality of light signals in the each image in the sequence of images; and
further comprising instructions to generate a plurality of feature vectors that describe each of the plurality of semantic keypoints, respectively.

19. The non-transitory computer-readable medium of claim 18, further comprising instructions to:
track a semantic keypoint associated with the target light signal across the sequence of images based at least in part on the plurality of feature vectors; and
create a time-series set of feature vectors associated with the target light signal.

20. The non-transitory computer-readable medium of claim 19, wherein the instructions to determine the second classification for the target light signal include instructions to determine, with a second neural network, the second classification for the target light signal based at least in part on the time-series set of feature vectors.

* * * * *